Aug. 14, 1928.

A. A. BENNETT ET AL 1,680,722

FISH ELEVATOR

Filed Nov. 23, 1926    3 Sheets-Sheet 2

Inventors
*Arthur A. Bennett*
*Cecil Bennett*

By *Clarence A. O'Brien*
Attorney

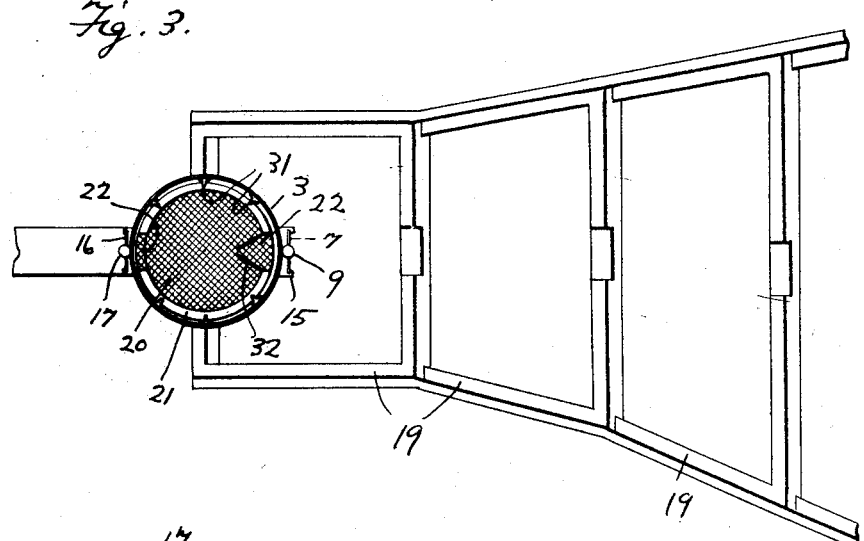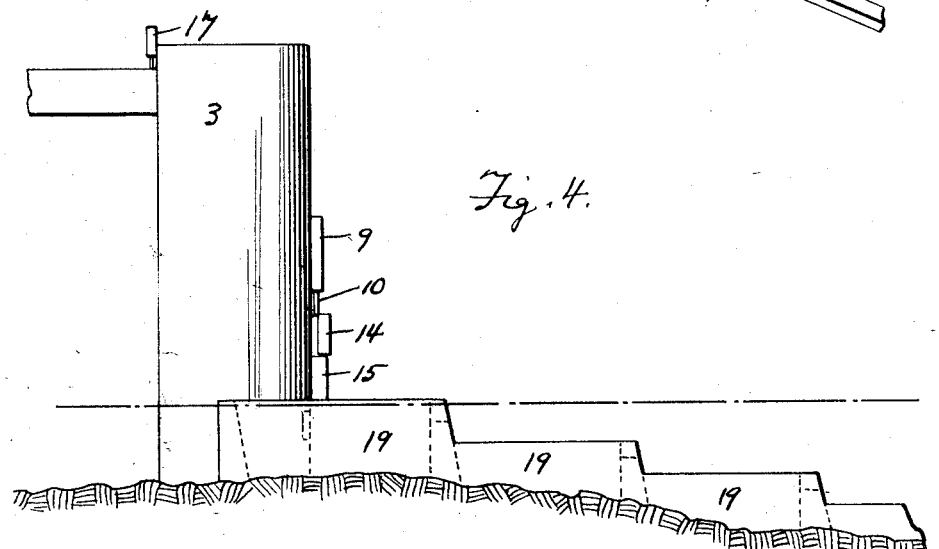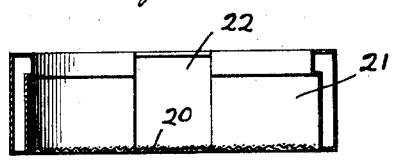

Patented Aug. 14, 1928.

1,680,722

UNITED STATES PATENT OFFICE.

ARTHUR A. BENNETT AND CECIL H. BENNETT, OF REEDSPORT, OREGON.

FISH ELEVATOR.

Application filed November 23, 1926. Serial No. 150,253.

The present invention relates to a fish elevator and has for its primary object to provide certain useful and new improvements upon the structure such as is disclosed in the patent granted to James R. Wheeler, No. 1,591,450, dated July 6, 1926.

More specifically, the object of the invention is to provide means whereby the level of the opening in the bottom of the fish passageway that is disposed vertically may be adjusted to meet the varying levels of the water. In our improved structure the opening and lower gate structure is made adaptable to various heads of water.

Another important specific feature of the invention lies in the provision of stop means for halting the rising of the float-supported grate in proper position in relation to the upper opening in the passageway.

A still further very important object of the invention is to generally improve upon fish elevators of this nature by providing an exceedingly simple construction, one that is thoroughly efficient and reliable in operation, inexpensive to build, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed:

In the drawing:

Fig. 3 is another top plan view thereof showing the fish traps associated therewith.

Fig. 4 is a side elevation of the shell in stream with fish traps leading up thereto, Fig. 5 is a section through the float-supported grate, Fig. 7 is a vertical section through the shell taken substantially on the line 7—7 of Fig. 1.

Figure 1:
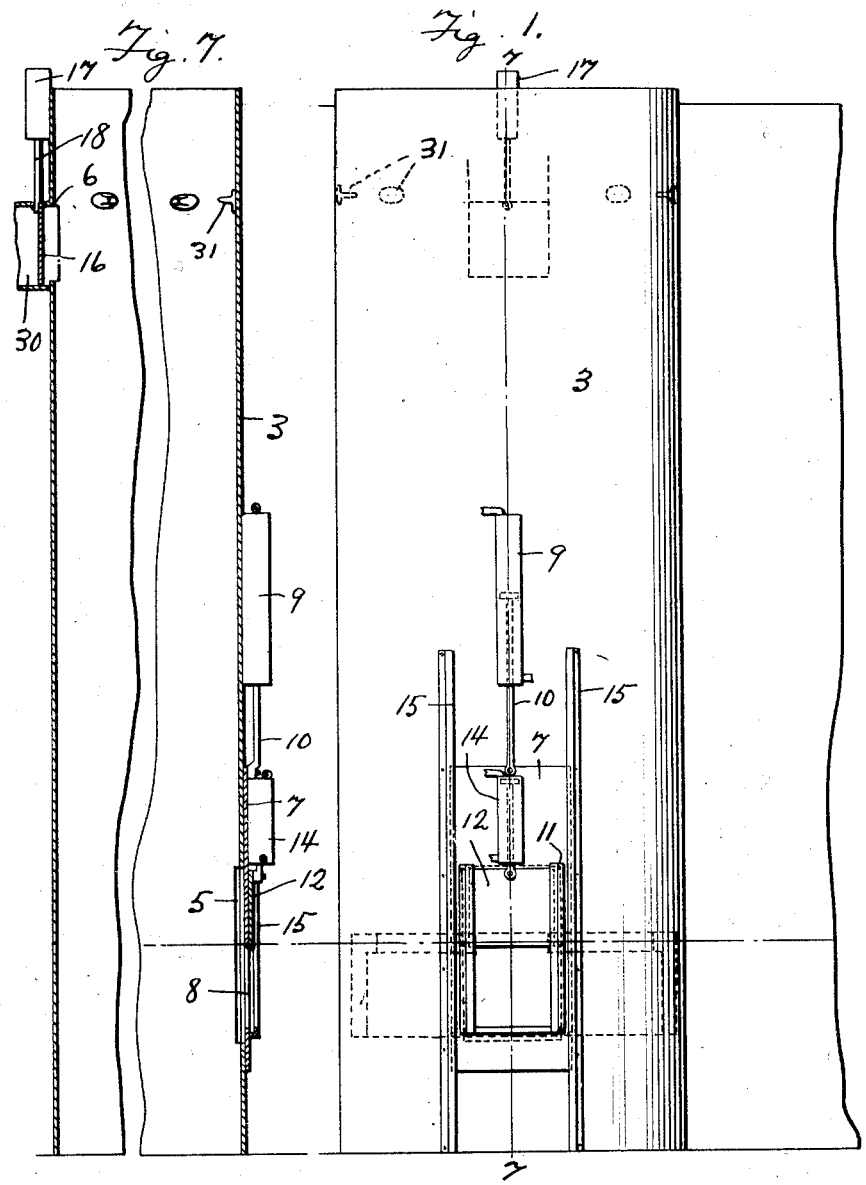
Figure 1 is a front elevation of the shell.

A vertical passageway is provided through which, by means of suitable gates, water is made to rise or fall to the levels respectively of the water at the bottom or top of the dam, obstruction, or the like. Such passageway may be constructed as may seem best, that illustrated being cylindrical in form, having a shell 3 of any suitable material. At the bottom of the shell 3 there is provided an opening 5 to allow the water from the lower part of the stream to enter the passageway and at the top another opening 6 is provided to allow the water from the upper part of the stream to enter the passageway.

A plate 7 is constructed with an opening 8 registering with the opening 5 and smaller than said opening 5. This plate may be moved vertically by suitable hydraulic or other means 9 engaged with the plate through rod 10 so that the bottom of the opening 8 is at a suitable level below the level of the lower stream. Vertical spaced cleats 11 are mounted on the plate 7 for slidably receiving a gate 12 which is operable by hydraulic or other means 14 mounted on the plate 7 for closing and opening the opening 8 in the plate 7. The plate 7 is slidable in vertical cleats 15 mounted on the front side of the shell 3. A gate 16 is mounted in cleats 17 on the rear side of the shell and is slidable vertically to close or open the opening 6. The gate 16 is operable by suitable hydraulic or other means 17 through rod 18. In Figures 3 and 4 I have shown an application of this shell associated with suitable water traps 19 mounted in the bottom stream.

Figure 2:
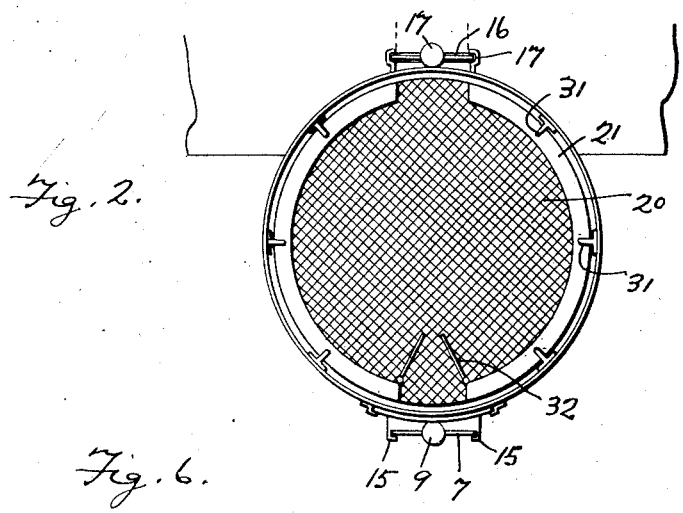
Fig. 2 is a top plan view thereof.

The float-supported grate comprises a foraminous bottom 20 having annular side walls 21 of hollow construction, the upper portion thereof being wider as is clearly indicated in Figure 4. Openings 22 are provided at opposite points in the side walls 21 for registering with openings 5 and 6. The diameter of the wall 21 is substantially equal to the interior diameter of the shell. This float-supporting grate is mounted in the shell as is indicated in Figure 2 and shown in dotted lines in Figure 1.

In use it will be seen that the plate 7 is adapted so that the upper edge of its opening 8 is at the level of the water in the lower stream. The gate 12 is then opened allowing the water to flow from the lower portion of the shell and this will maintain the float-supported grate at the proper level to register one of its openings 22 with the opening 8 so that the fish may be trapped therein. The gate 12 is closed after a time and the gate 16 is opened so that the water from the upper stream 30 will flow into the shell until the level of the water in the shell is coincident with that in the passage 30. The rising of the water, will, of course, cause the rising of the float-supported grate until the opening 22 on the other side there registers with the opening 6. We provide stops 31 interiorly of the shell to prevent the float-supported grate from rising too high in case the level of the water in the upper stream should be higher than the opening 6. Thus the fish will swim out of the float-supported grate to the upper stream. It is also obvious that by closing the gate 16 and opening the gate 12 the level of the water in the shell may be brought down to the level of the water in the lower stream so as to place the float supported grate in its initial position as explained. It is preferable to provide trap wings 32 extending inwardly from the entrance opening 22 of the float-supported grate. These trap wings extend inwardly and converge inwardly towards each other terminating in spaced relations.

Figure 6:
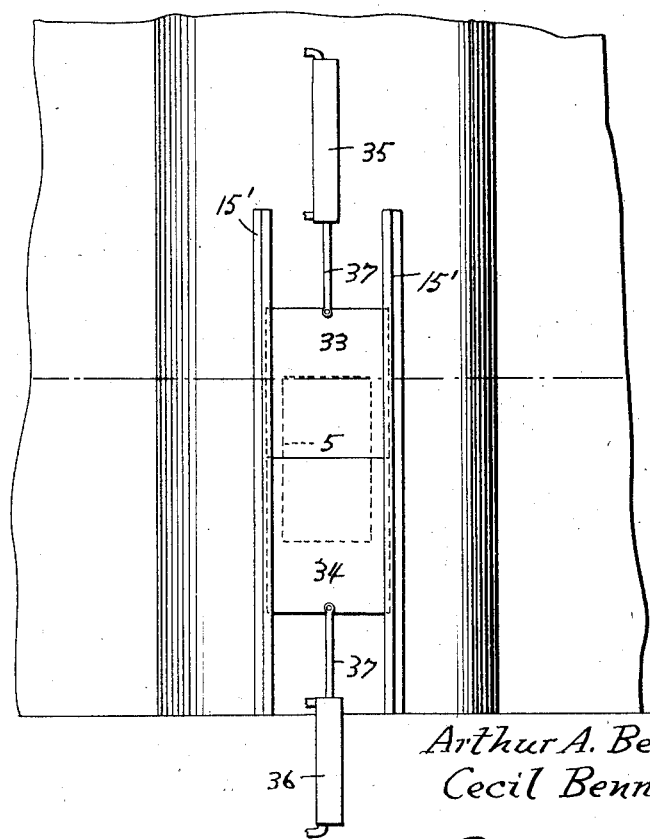
Fig. 6 is an enlarged detail elevation of the lower portion of the shell showing a modification of the draw structure.

In Figure 6 a modification of the lower gate structure has been disclosed wherein it will be seen that cleats 15' are provided positioned similarly to cleats 15. The opening 5' is the same as openings 5. Gates 33 and 34 are slidable in the cleats over the opening 5' and are operable by hydraulic or other means 35 and 36, respectively, through rods 37. In this modification the upper edge of the gate 34 is placed at a suitable level below the level of the water in the stream below the obstruction, the level of the bottom of the opening 22 at the entrance of the float 46 and then the gate 33 is raised.

It is thought that the construction, operation, and utility of this invention will now be clearly understood without a more detailed description thereof. This device may be of any size and construction of any material and form and operated by any means found convenient and suitable for a device of this character, and while we have illustrated and described a form of construction and arrangement of parts found desirable in materializing our invention, we wish to include in this invention all mechanical equivalents and substitutes as may fairly be considered to come within the scope or purview of our invention as defined in the appended claims.

Having thus disclosed our invention, what we claim as new is:—

1. In a fish elevator, a vertical hollow casing adapted to receive fish therein and having an opening in the bottom portion thereof and an opening in the top portion thereof, a float-supported grate within said casing for the purpose of confining fish near the surface of the water within said casing, a gate structure associated with the upper opening, a plate associated with the opening in the bottom portion of the casing, said plate having an opening, means for raising and lowering the plate, and a gate structure associated with the opening in said plate.

2. In a fish elevator, a vertical hollow casing adapted to receive fish therein, said casing having a top opening and a bottom opening, means for vertically shifting the vertical location of the bottom opening, gate structures associated with the openings, and a float supported grate within said casing for the purpose of confining fish near the surface of the water within the casing.

3. In a fish elevator, a vertical hollow casing adapted to receive fish therein, said casing having a top opening and a bottom opening, means for vertically shifting the vertical location of the bottom opening, gate structures associated with the openings, and a float-supported grate within said casing for the purpose of confining fish near the surface of the water within the casing, and stop means adjacent the opening in the top of the casing to hold the fish in the float-supported grate adjacent said top opening.

4. A float-supported grate for a fish elevator of the class described comprising a foraminous bottom, a hollow annular wall rising from the bottom and having oppositely disposed openings, said wall forming a float.

5. A float supported grate for a fish elevator of the class described comprising a foraminous bottom, a hollow annular wall rising from the bottom and having oppositely disposed openings, said wall forming a float, a pair of trap wings extending inwardly from the sides of one of the openings and converging inwardly toward each other.

In testimony whereof we affix our signatures.

CECIL H. BENNETT.
ARTHUR A. BENNETT.